Oct. 27, 1953   R. W. GOBLE   2,656,613
APPARATUS FOR CALIPERING WELL BORES
Filed April 17, 1948   3 Sheets-Sheet 3
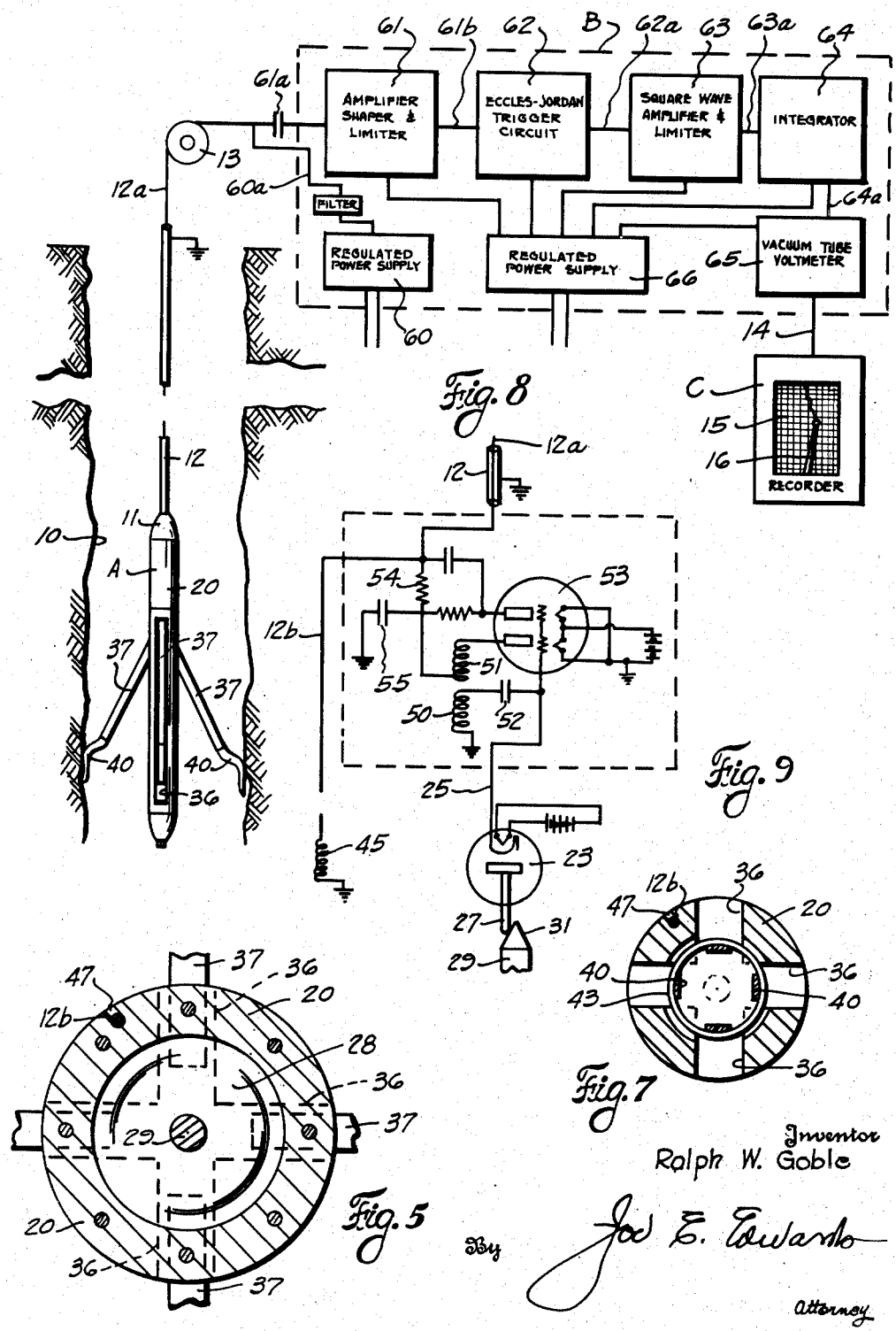
Inventor
Ralph W. Goble

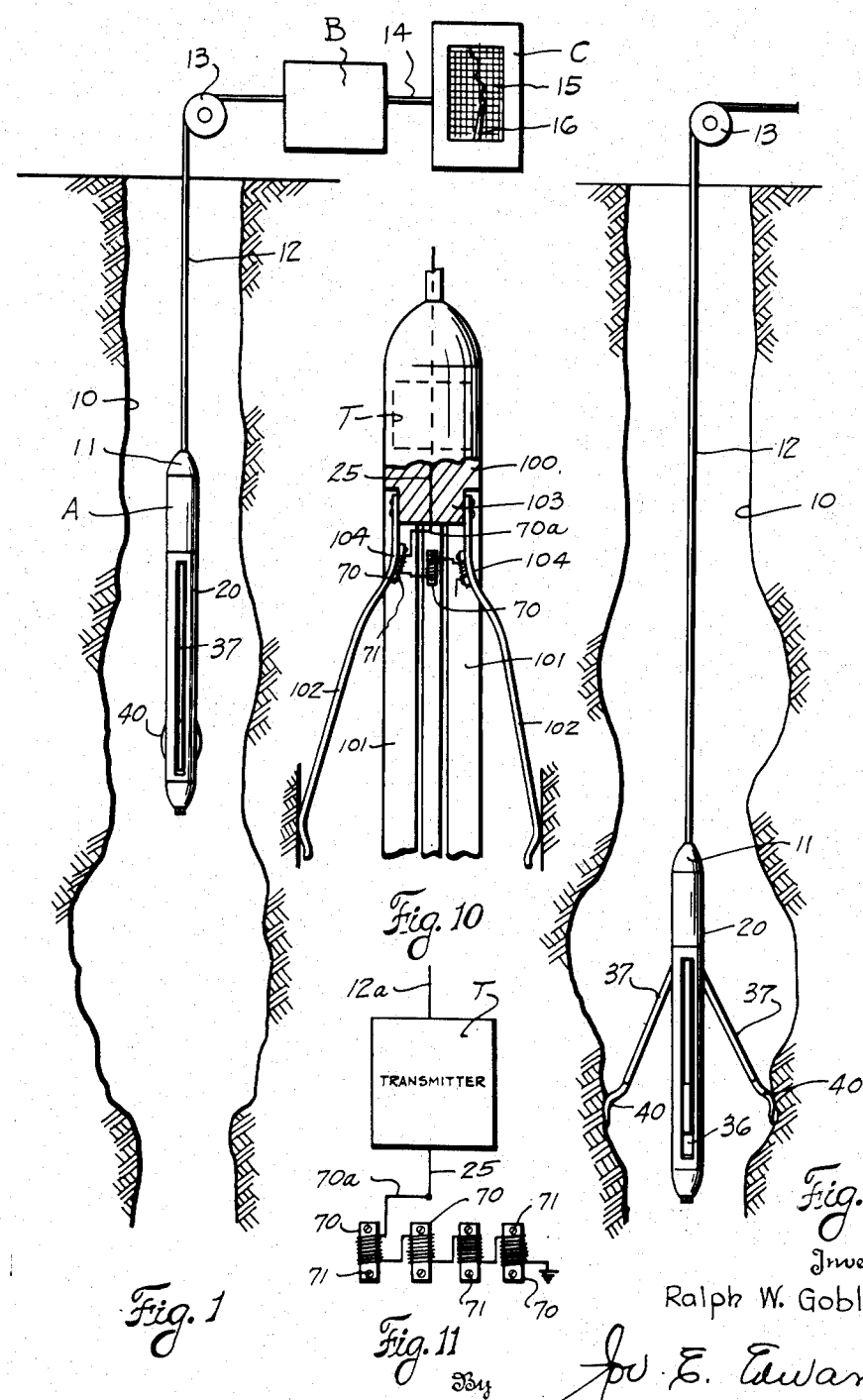

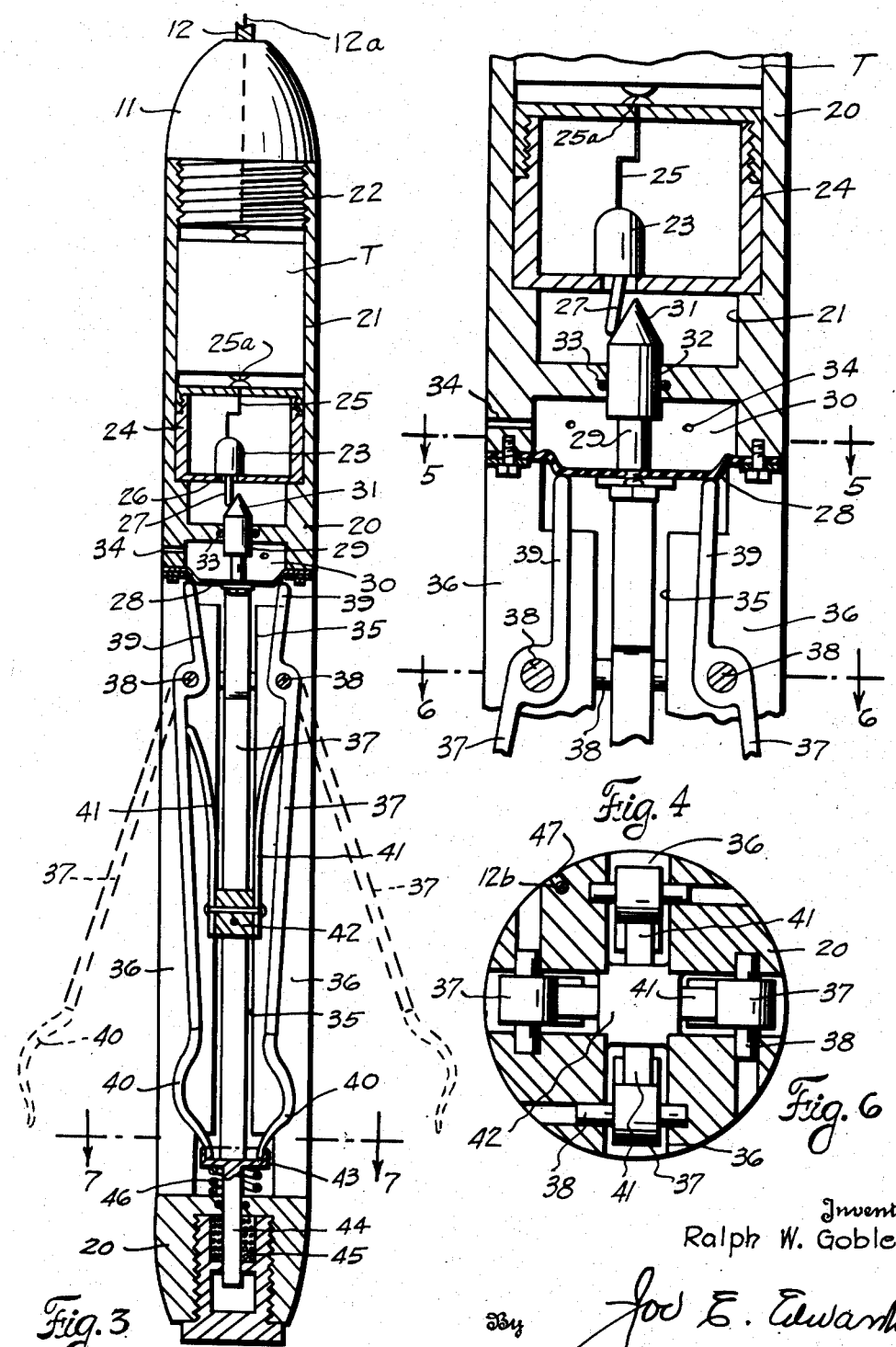

Patented Oct. 27, 1953

2,656,613

UNITED STATES PATENT OFFICE 2,656,613

APPARATUS FOR CALIPERING WELL BORES

Ralph W. Goble, Long Beach, Calif., assignor to Eastman Oil Well Survey Company, Denver, Colo., a corporation of Delaware Application April 17, 1948, Serial No. 21,633

6 Claims. (Cl. 33—178)

This invention relates to new and useful improvements in apparatus for calipering well bores.

One object of the invention is to provide an improved method and apparatus for accurately measuring the diameter or cross-sectional area of a well bore and for simultaneously and continuously recording the measurement being made at the surface of said bore.

An important object of the invention is to provide an improved apparatus for calipering a well bore which includes a mechanical measuring instrument having movable measuring elements which are adapted to be lowered within a well bore, together with means for utilizing the movements of said arms, as such movements are controlled by the well bore diameter, to control the frequency of transmitted electrical pulses, whereby the frequency is representative of the cross-sectional area of the bore being measured to thereby provide information with respect to said cross-sectional area.

Another object of the invention is to provide an improved apparatus for measuring the cross-sectional area of a well bore which includes a measuring instrument adapted to be lowered within the well bore on a single conductor cable and having movable arms engageable with the wall of said bore; said apparatus having a transmitter incorporated within the instrument which transmits electrical pulses to the surface, together with improved means controlled by the movement of the measuring arms for varying the frequency of the transmitted pulses in accordance with the position of said arms, whereby the frequency of the pulses is representative of the cross-sectional area or diameter of the well bore being measured.

Still another object of the invention is to provide an improved apparatus of the character described, wherein movable measuring arms are utilized to flex or place under a strain a flexible element, with the flex or strain being in accordance with the positions of said arms, together with an electrical strain gauge means associated with the flexible element for measuring the flex or strain thereof, whereby the measurements made by said strain gauge means may be employed to provide visible indications which are representative of the positions of said arms to indicate the cross-sectional area of the well bore.

A further object of the invention is to provide an improved apparatus for calipering a well bore wherein electrical pulses are generated and transmitted by a measuring instrument, together with a triode transducer tube connected in the transmitter circuit for controlling the frequency of the generated pulses; said control tube being actuated by movable measuring arms which contact the well bore, whereby the movement of said arms operates said tube to thereby control the frequency of the generated pulses in accordance with the particular positions of the measuring arms, with the result that the frequency of the generated pulses is representative of the well bore cross-sectional area as measured by said arms.

A particular object of the invention is to provide an improved apparatus of the character described, wherein the movement of mechanical measuring arms is utilized to vary the internal resistance of a control tube which is electrically connected in an oscillator circuit, whereby the variations in the internal resistance of the tube causes a change in the rep rate or frequency of the electrical pulses generated by the oscillator so that the frequency variations of said pulses are representative of the movement of measuring arms and are therefore indicative of the cross-sectional area of the well bore.

Still another object of the invention is to provide an improved apparatus, of the character described, which may be lowered by means of a single conductor cable which functions not only as a lowering element but also transmits the electrical current from the transmitter in the instrument being lowered to the surface recording equipment; the apparatus including a single electrical control element which is acted upon by a plurality of mechanical measuring arms in such manner that the movement of all arms is automatically integrated so that the variations produced in said electrical element by the movement of the arms are an average or mean measurement of the positions of all of said arms.

The construction designed to carry out the invention will be hereinafter described together with other features of the invention.

The invention will be more readily understood from a reading of the following specification and by reference to the accompanying drawing, wherein an example of the invention is shown, and wherein:

Figure 1 is a sectional view of a well bore illustrating an apparatus, constructed in accordance with the invention being lowered therethrough, Figure 2 is a similar view illustrating the measuring arms moved outwardly to their measuring position and with the measuring instrument in a position just prior to upward movement within the well bore, Figure 3 is an enlarged, transverse, vertical, sectional view of the measuring instrument, Figure 4 is an enlarged, sectional detail illustrating the connection between the movable arms and the electrical frequency control element, Figure 5 is a horizontal, cross-sectional view taken on the line 5—5 of Figure 4, Figure 6 is a horizontal, cross-sectional view taken on the line 6—6 of Figure 4, Figure 7 is a horizontal, cross-sectional view taken on the line 7—7 of Figure 3, Figure 8 is a block diagram of the surface equipment, Figure 9 is a wiring diagram of the transmitter, Figure 10 is a partial, sectional view of a modified form of the invention, and Figure 11 is a partial wiring diagram of this modification.

In the drawings, the numeral 10 designates a well bore which extends downwardly through the subsurface strata from the ground surface. A well caliper unit or instrument A, which will be hereinafter described in detail, is arranged to be lowered within the well bore and said unit is connected by means of a suitable cable socket 11 to the lower end of a single conductor cable 12, the latter functioning to suspend or support the unit or instrument and at the same time to provide an electrical connection between said unit and the surface equipment. The conductor cable 12 may be of the usual type having an outer sheath which forms an efficient ground and said cable extends upwardly to the surface passing over a suitable sheave or pulley 13 in the derrick (not shown) and having electrical connection with a receiving and measuring unit B. The unit B is connected through a conductor or wire 14 with a suitable recorder C.

The recorder is of standard construction and may be any suitable recording mechanism, said recorder being preferably a GE photo-electric recorder. The recorder includes a movable tape or chart 15, the movement of which is synchronized with the rate of lowering of the instrument A and a marking stylus 16 is adapted to traverse said tape or chart. Although it is desirable that a GE photo-electric recorder be employed, it is noted that any suitable electrically actuated recording mechanism may be used. The stylus 16 is electrically controlled in accordance with the operation of the caliper unit or instrument A and receiver B, and as will be explained, functions to form a continuous permanent record of the measurement being made.

The unit or instrument A which is arranged to be lowered within the well bore by means of the cable 12 is shown in detail in Figures 3 to 6 and includes a main body 20 which is generally cylindrical in cross section. The upper portion of the body is formed with a chamber 21 which is adapted to receive a pulse oscillator or electrical transmitter T and the upper end of the chamber is threaded at 22 whereby the cable socket 11 may be connected therewith. The oscillator or transmitter T, which will hereinafter be described in detail, is arranged to generate and transmit electrical pulses of a predetermined frequency which are conducted to the surface through an electrical conductor 12a which is housed within the outer grounded sheath of the cable 12. Included as an integral part of the electrical circuit of the transmitter is a triode transducer or control tube 23 which is mounted within an inner casing 24 disposed in the lower end of the chamber 21 below the transmitter. The transducer or control tube is electrically connected through a wire 25 and contacts 25a in the electrical circuit of the pulse oscillator or transmitter T and functions to control the frequency of the generated pulses, as will be explained. The inner casing within which the tube 23 is mounted is provided with an opening 26 in its bottom and a movable anode rod or pin 27 which forms an integral part of the tube 23 extends downwardly through this opening.

The triode transducer tube 23 is actually an electrical strain gauge for measuring strain or stress of flexible elements and is a standard tube which may be purchased from the Radio Corporation of America, being identified as an RCA electronic transducer triode No. C798-B. The pin or anode rod 27 protrudes from the tube and is movable laterally with respect to the axis of the tube. A transverse movement of the anode rod or pin 27 causes a movement with respect to the cathode of the tube and this varies the internal resistance of said tube. As will be evident from the detailed explanation of the wiring diagram of the pulse oscillator or transmitter T, the variation in the tube resistance results in a change of the frequency of the transmitted electrical pulses and this change in frequency is directly proportional to the amount of lateral movement of the anode rod or pin 27.

For imparting a lateral movement to the anode rod or pin 27, a flexible disk or diaphragm 28 which is preferably metallic has an upstanding operating stem 29. The stem is mounted within the body 20 in a diaphragm chamber 30 formed below the chamber 21. The upper end of the stem 29 is conical as indicated at 31 and this conical surface engages the depending anode rod or pin 27 of the transducer tube 23. As is clearly shown in Figure 4, an upward movement or flexing of the disk or diaphragm 28 moves its operating stem 29 upwardly and this results in a lateral displacement of the anode rod 27 of the tube, with such displacement being directly proportional to the movement of the stem. The stem is slidable through an axial opening 32 which is formed in the body 20 between the chambers 21 and 30 and said stem is suitably sealed off by an annular packing ring 33. The well pressure may act on the underside of the flexible diaphragm and to equalize pressures across said diaphragm, the casing may be provided with radial equalizing ports or passages 34. It is noted that the exposed upper area of the diaphragm is slightly larger than the exposed lower area thereof so as to compensate for the cross-sectional area of the stem 29 and assure equalization of pressure acting on opposite sides of said diaphragm. Actually, the tube 23 measures the flex or strain of the disk or diaphragm as the same is moved.

Below the diaphragm chamber 30 the body 20 is formed with an axial bore 35 and a plurality of elongate, radially disposed slots 36 (Figure 6) extending from the bore outwardly through the wall of the body. Elongate measuring arms 37 are pivotally mounted at 38 within the slots 36 and the upper end of each arm is formed with an extension 39 which has its upper end engaging the underside of the flexible disk or diaphragm 28. The pivot point of each arm, together with the length of its extension is such that when the arms are swung about their pivots, the upper ends of the extensions swing in an arc relative to the lateral plane of the disk or diaphragm, with the result that as the lower end of each arm 37 swings outwardly, the upper end of its extension 39 flexes or places the disk under strain to raise said disk. The degree of flexing or strain and the resultant travel or movement of the disk or diaphragm will, of course, be proportional to the outward movement or swinging of the arms. Each arm is provided with a wear shoe 40 at its lower end and the lower ends of the arms are urged outwardly by leaf springs 41 which have their ends engaging the inner surfaces of the arms, with their lower ends riveted or otherwise secured to a fixed block 42 which is located in the axial bore 35 of the body. It is preferable to employ three or more measuring arms so as to provide three or more points of contact on the flexible disk or diaphragm. As shown, four arms giving a four point contact are provided and an automatic integration of the movement of the arms is produced, for obviously all of the extensions of said arms will remain in contact with the diaphragm at all times. Thus, even though one arm may move a greater distance than the others, the movement of the diaphragm and operating stem will represent an average of the movement of all arms, whereby the cross-sectional area of the bore will be indicated by the amount of movement of the stem 29.

Since the extension 39 of each measuring arm engages the flexible disk or diaphragm 28, it will be evident that swinging of the measuring arms will result in a flexing of the diaphragm with the flex or strain on the diaphragm and its resultant movement being directly proportional to the swinging of said arms. As the diaphragm is moved upwardly by the swinging of the measuring arms, its operating stem 29 is raised, whereby the anode rod or pin 27 of the transducer tube 23 is displaced laterally. As has been explained, the lateral displacement of the rod or pin 27 is a measurement of the degree of flexing or strain on the diaphragm and results in a change in the frequency of the electrical pulses which are generated by the pulse generator or transmitter T. It thus becomes obvious that the change in the frequency of the transmitted pulses is directly proportional to the positions of the measuring arms 37 and is therefore, indicative of the cross-sectional area of the well bore.

For latching the lower ends of the arms inwardly to permit lowering of the instrument A downwardly through the well bore, the lower end of each wear shoe 40 is adapted to be retained within a flanged retaining plate 43. This plate is secured to the core 44 of an electrical solenoid 45 which is mounted in the lower end of the body 20. A coil spring 46 normally urges the solenoid core 44 upwardly to maintain the measuring arms latched inwardly against tension of the leaf springs 41. Electrical current from the surface and flowing downwardly through the conductor 12a may be directed to the solenoid through a connecting cable or wire 12b which extends downwardly to the solenoid through a groove 47 formed in the outer surface of the body 20. When the circuit to the solenoid is closed, the core 44 thereof is moved downwardly which disengages the flanged retainer plate 43 from the wear shoes 40 and thereby allows the leaf springs 41 to urge the measuring arms outwardly into engagement with the wall of the well bore. Obviously the wall of the bore limits the movements of the measuring arms, with the result that the disk or diaphragm 28 is placed under a certain degree of strain and its operating stem is moved upwardly in direct ratio or proportion to the outward movement of said arms. This upward movement of the stem results in a lateral displacement of the anode rod of the transducer tube 23 which, in turn, varies the frequency of the pulses being generated by the pulse oscillator or transmitter T. The variations in the frequency of the transmitted pulses are utilized to operate the surface recorder C, as will be explained, to thereby provide a visual indication of the position of the arms and of the cross-sectional area of the well bore.

The pulse oscillator or transmitter T may be subject to some variation and is arranged to generate and transmit electrical pulses. It is preferable that the pulses which are generated and transmitted be negative only but if desired, such pulses could be positive. Referring to the wiring diagram of the oscillator or transmitter T in Figure 9, the unit includes a blocking oscillating circuit which comprises coils 50 and 51, condenser 52 and the control or transducer tube 23. An amplifier tube 53 is coupled in the circuit and is arranged so as to amplify only the negative side of the oscillator cycle, whereby only negative pulses are generated and transmitted. The tube 23 is connected to the oscillator through wire 25. The frequency of the transformer coils 50 and 51 are controlled by the RC circuit which comprises the condenser 52 and the resistance formed by the tube 23 so that actually the resistance of the tube 23 controls the time required to discharge the condenser 52. As the internal resistance of the tube 23 is varied by the lateral displacement of its anode rod or pin 27, the discharging time of the condenser 52 is varied accordingly and thus, the frequency of the transmitted negative pulses is controlled by this RC circuit and is varied in direct ratio to the variations in the internal resistance of the tube. A filter resistor 54 is connected in the conductor 12a which extends to the surface and a filter condenser 55 is associated therewith, these parts functioning to prevent feeding back of the transmitted pulses into the blocking oscillator circuit.

It will be obvious that this ararngement of the oscillator or transmitter T results in the generation and transmission of electrical pulses which are conducted upwardly to the surface through the conductor 12a. The frequency of these pulses is controlled and varied in direct proportion to the variation in the internal resistance of the tube 23 and since this internal resistance of the tube is varied in direct ratio to the position of the measuring arms and the cross-sectional area of the well bore, it might be said that the frequency of the transmitted electrical pulses is indicative or representative of the cross-sectional area of the well bore.

The receiving unit B and the recorder C are illustrated in block diagram in Figure 8 and as shown therein, the cable 12 and its conductor 12a extend upwardly from the measuring instrument A to the surface. The required power for operating the oscillator or transmitter T may be furnished by a regulated power supply 60 which has connection through a conductor 60a with the conductor 12a whereby said conductor functions to carry the current required to operate the oscillator or transmitter and is also the carrier for the transmitted electrical pulses which are representative of the cross-sectional area of the well bore. The outer sheath of the cable 12 is the ground side of the circuit as is usual practice.

The receiving unit B at the surface includes an amplifier, shaper and limiter 61 to which the upper end of the conductor 12a is electrically connected. A suitable blocking condenser 61a may be connected in the conductor 12a beyond the point at which the power supply line 60a has connection therewith and said condenser functions to prevent the current supplied by the power supply 60 from flowing through the cable 12a into the circuit 61.

The receiving unit B also includes an Eccles-Jordan trigger circuit 62 which has connection with the amplifier, shaper and limiter 61 through the wire 61b. The trigger circuit is connected through wire 62a with a square wave amplifier and limiter 63 which also forms part of the receiving unit. The square wave amplifier and limiter has connection through a conductor 63a with an integrator 64 and the latter is, in turn, connected through the wire 64a with a vacuum tube voltmeter 65. The units 61 to 65 are supplied with necessary power through a suitable voltage regulated power supply 66. The circuits which are included in the units 61 to 65 comprise the receiver B and, as will be explained, function to receive the transmitted electrical pulses and to so convert them that said pulses may be utilized to actuate the recorder C. Actually the receiver B comprises a counter circuit or frequency meter and the particular details of its electrical circuit are subject to some variation.

The vacuum tube voltmeter 65 is connected through the wire 14 with the recorder C and said voltmeter functions to actuate the stylus 16 of said recorder in the usual manner. The electrical pulses which are received by the unit B have their frequency transposed in such a manner as to actuate the voltmeter to control the position of the stylus 16 of the recorder. Thus, it becomes obvious that as the amplitude varies in accordance with variations in frequency, movement is imparted to the stylus 16 to cause said stylus to visibly record the cross-sectional area of the well bore being measured.

In the operation of the apparatus, the measuring arms 37 of the instrument A are latched in their inward or retracted position as shown in Figure 3. In this position, the flexible disk or diaphragm 28 is not under stress and is in a lowered or normal position and its operating stem 29 has allowed the anode rod or pin 27 of the transducer or control tube 23 to extend substantially in a normal position axially aligned within the tube. Operation of the transmitter at this point generates pulses of predetermined frequency and the calibration of the recorder C is such that at this time the stylus 16 thereof is in its zero or starting position.

The instrument or assembly A is then lowered downwardly within the well bore and when the instrument reaches the position at which measuring is to commence, an electrical circuit is closed to the latching solenoid 45, whereby the core 44 of said solenoid and the flanged retaining plate 43 are moved downwardly against tensioning of the coil spring 46. Downward movement of the flanged retaining plate 43 releases the measuring arms 37 for outward movement and immediately the leaf springs 41 swing the lower ends of said arms outwardly into engagement with the wall of the well bore 10.

As the measuring arms move outwardly, the extensions 39 at the upper ends thereof swing in an arc inwardly of the flexible disk or diaphragm 28 and function to flex the disk to place the same under a predetermined strain or stress in accordance with the outward positions of said arms. The flexing of the disk causes an upward movement of the diaphragm and its attached operating stem 29 and this movement is proportional to the distance which the arms 37 have swung and therefore the operating stem is moved in direct ratio to the cross-sectional area of the well bore. The upward movement of the operating stem results in a lateral displacement of the anode rod or pin 27 of the tube 23, whereby the internal resistance of the tube is varied. Since the tube is electrically connected in the oscillator or transmitter circuit, variation in the internal resistance of the tube results in a change in the frequency of the transmitted pulses. Thus, it becomes obvious that the particular frequency of the pulses is in accordance with the position of the measuring arms and is, therefore, representative of the cross-sectional area of the well bore. It will be apparent that as the instrument A is pulled upwardly through the well bore, the lower ends of the extended arms will follow the contour of the well bore and will move inwardly and outwardly in accordance with such contour. This continuous change in the position of the arms, as controlled by the cross-sectional area of the well bore, will result in a constant flexing of the disk or diaphragm and a constant variation of frequency which is representative of said cross-sectional area of the well bore.

The electrical pulses, the frequency of which is representative of the cross-sectional area of the well bore, are transmitted upwardly through the cable 12a and are conducted to the amplifier, shaper and limiter 61 of the receiving unit. The amplifier, shaper and limiter 61 is provided for the purpose of returning the pulses to their original pattern or wave form, that is, to the same form which they had as they left the pulse oscillator or transmitter T and prior to the time that they were affected by the conductor cable 12a. In addition the unit 41 limits the pattern or shape of the pulses to provide uniformity of pattern and at the same time said unit amplifies said pulses.

From the circuit 41 the electrical pulses flow through the Eccles-Jordan trigger circuit 62 which functions to convert the wave form into a square wave. If only negative pulses are transmitted, as is preferable, the trigger circuit is sensitive only to such negative pulses. The pulses of a square wave pattern then flow through the square wave amplifier and limiter 63 which functions to amplify and limit said waves. From this circuit the waves are directed into the integrator 64 which, as is well known, rectifies the square waves and transposes them so that such will have an amplitude which is directly proportional to the frequency of the pulses. This transposed square wave, as has been explained, actuates the vacuum tube voltmeter 65 which, in turn, controls the movement of the stylus 16 of the recorder. Since the amplitude of the transposed square wave which operates the voltmeter 65 is directly proportional to the frequency of the electrical pulses and also since said frequency is controlled in accordance with the cross-sectional area of the well bore, it will be evident that the amplitude will vary in direct ratio to any variation or change in cross-sectional area of the well bore. Thus, the varying amplitude is a direct measure of the varying frequency which is, in turn, representative of well bore area variation and therefore, the stylus moving over the recording chart 15 provides a visible record of the variations in the cross-sectional area of the well bore. It will, of course, be evident that the movement of the chart 15 will be synchronized with the movement of the lowering cable 12, whereby the length of said chart is representative of depth.

From the foregoing it will be seen that a relatively simple and efficient means for measuring the cross-sectional area of a well bore is provided. The pulse oscillator or transmitter T generates and transmits electrical pulses of a predetermined frequency and the single control element 23, in the form of a transducer tube or electrical strain gauge, varies the frequency of said pulses in direct proportion to variations in well bore diameter. The tube being a single element may be readily mounted within the instrument A and a simple operative connection between the movable anode rod 27 of the tube and the measuring arms may be made so that displacement of the rod is proportional to the movement of the measuring arms. As illustrated, a diaphragm arrangement is employed for effecting displacement of the anode rod but it is apparent that other mechanical connecting means for transmitting the motion of the measuring arms to the displaceable anode rod may be made. The diaphragm means illustrated provides a simple type of connection with substantially no back off or sealing problems and is preferable for that reason. As has been stated, any suitable pulse oscillator circuit may be employed in the transmitter or oscillator T; also, the surface equipment which includes the receiver B and recorder is subject to variation and so long as the frequency of the transmitted pulses is converted into a visible indication of the variations in such frequency, the purposes of the present invention will be accomplished.

In Figures 1 to 8 the transducer or control tube which comprises one type of strain gauge has been illustrated but it is pointed out that other types of strain gauges may be employed. In Figures 10 and 11, a modification of the apparatus is illustrated wherein an ordinary type of resistance strain gauge 70 is shown. In this form of the invention a body 100 is provided with four radial slots 101 within which leaf spring measuring arms 102 are mounted. The arms 102 have a sufficient inherent resiliency to urge them outwardly to a measuring position in engagement with the wall of the well bore. The upper end of each arm is riveted or otherwise secured to an annular support or ring 103 and obviously as the arms swing outwardly, they are flexed to a greater or lesser degree, in accordance with the well bore diameter. Each arm has a curved section 104 which is spaced below the point of attachment and this curved portion will clearly reflect any strains or stresses which occur in the arm as the same moves outwardly. The resistance strain gauge 70 is fastened by screws 71, or otherwise to the inner surface of the arm 102 adjacent the curved portion 104, whereby any flexing of the arm will result in a movement of the resistance wire or coil.

One strain gauge 70 is provided for each arm and the resistance wire or coil of each gauge is connected in series with the coils or wires of the other gauges. A connecting wire 70a is coupled to the wire 25 which leads to the oscillator or transmitter T. It will be evident that as the arms 102 move inwardly and outwardly in following the contour of the well bore, the electrical resistances of the strain gauges 70 are varied accordingly and this variation in resistance will control the frequency or rep rate of the pulses which are generated by the oscillator or transmitter T. Because the resistance coils or wires of the strain gauges 70 are connected in series, an accurate integration will be obtained, whereby the resistance which controls the frequency of the generated pulses is an average which is representative of the average position of the four measuring arms. In this form of the invention the generated pulses are conducted to the surface equipment in the same manner as hereinbefore described and the frequency of said pulses is utilized to control the operation of the recorder C.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. In well caliper apparatus for measuring an earth bore which may have relatively wide variations in diameter, a measuring unit for movement longitudinally in a well bore to thereby produce electrical current whereby visible recording can be accomplished by electrical response means at the surface, said unit comprising a plurality of members each capable of engaging the bore at circumferentially spaced points and movable in accordance with variations in the cross-sectional area of the bore as the unit is moved, an electrical transmitter means carried by the unit and including means for generating and transmitting electrical impulses of predetermined frequency, and means including strain gauge means controlled by the plurality of members movable in accordance with the variations in the cross-sectional area of the bore for directly varying the frequency of the transmitted electrical impulses, said strain gauge means being associated with the plurality of movable members so that the direct varying of the frequency being transmitted will be such as to be representative of the average position of the movable members.

2. In well caliper apparatus for measuring an earth bore having relatively wide variations in diameter, a measuring unit for movement longitudinally in a well bore to thereby produce electrical current whereby visible recording can be accomplished by electrical response means at the surface, said unit comprising a plurality of members each capable of engaging the bore at circumferentially spaced points and movable in accordance with variations in the cross-sectional area of the bore as the unit is moved, an electrical transmitter means carried by the unit and including means for generating and transmitting electrical impulses of predetermined frequency, means including strain gauge means controlled by the plurality of members movable in accordance with the variations in the cross-sectional area of the bore for directly varying the frequency of the transmitted electrical impulses, said strain gauge means being associated with the plurality of movable members so that the direct varying of the frequency being transmitted will be representative of the average position of the movable members, said strain gauge means and transmitter being positioned in a closed compartment separated from the movable members, and the direct controlling means including a flexible diaphragm acting as a wall of the compartment and acted on by the movable members to have a movement corresponding to the average movement of the members, and means for causing the movement of the diaphragm to act on the strain gauge means.

3. In well caliper apparatus for measuring an earth bore having relatively wide variations in diameter, a measuring unit for movement longitudinally in a well bore to thereby produce electrical current whereby visible recording can be accomplished by electrical response means at the surface, said unit comprising a plurality of members each capable of engaging the bore at circumferentially spaced points and movable in accordance with variations in the cross-sectional area of the bore as the unit is moved, an electrical transmitter means carried by the unit and including means for generating and transmitting electrical impulses of predetermined frequency, means including strain gauge means controlled by the plurality of members movable in accordance with the variations in the cross-sectional area of the bore for directly varying the frequency of the transmitted electrical impulses, said strain gauge means including a strain gauge element for each movable member, means for associating each element with a movable member so it will be controlled by the movement thereof, and means connecting the strain gauge elements to the transmitter so the frequency transmitted will represent an average of the positions of the movable members.

4. A well caliper apparatus for measuring the cross-sectional area of a well bore including, a measuring unit adapted to be moved longitudinally within a well bore and having movable measuring arms which engage the wall of said bore and which are moved in accordance with the variations in the cross-sectional area of said bore, an electrical transmitter mounted in said measuring unit and including means for generating and transmitting electrical impulses of predetermined frequency, a strain gauge means electrically connected in the transmitter circuit for varying the frequency of the transmitted impulses, and means operatively connected to the measuring arms for direct actuating of the strain gauge means so that the variations in the frequency of the transmitted impulses are representative of the cross-sectional area of the well bore, said operative connecting means between the arms and the strain gauge means embodying means causing the direct actuation to be an average of the movement of the arms.

5. A well caliper apparatus for measuring the cross-sectional area of a well bore including, a measuring unit adapted to be moved longitudinally within a well bore and having movable measuring arms which engage the wall of said bore and which are moved in accordance with the variations in the cross-sectional area of said bore, an electrical transmitter mounted in said measuring unit and including means for generating and transmitting electrical impulses of predetermined frequency, a strain gauge means electrically connected in the transmitter circuit for varying the frequency of the transmitted impulses, and means operatively connected to the measuring arms for direct actuating of the strain gauge means so that the variations in the frequency of the transmitted impulses are representative of the cross-sectional area of the well bore, said operative connecting means between the arms and the strain gauge means embodying means causing the direct actuation to be an average of the movement of the arms, said last named means embodying a flexible element operated on by the arms so that a part can have a movement which will be representative of the positions of the arms.

6. In a well caliper apparatus, a measuring instrument including, an elongate body adapted to be lowered within a well bore, a plurality of measuring arms movably mounted on said body and normally urged toward an outward position whereby said arms engage the wall of the well bore and are moved inwardly and outwardly in accordance with variations in the well bore diameter, an electrical transmitter mounted in a compartment of the body and having means for generating and transmitting electrical pulses of predetermined frequency, a flexible element acting as a wall for the compartment and engaged by the measuring arms so as to be flexed to a greater or lesser degree in accordance with the position of said arms, said arms so acting on the flexible element that a part thereof will have a degree of flexing representative of the average position of said arms, and a triode transducer tube electrically connected in the electrical circuit of the transmitter and having a movable anode rod which is operatively connected with part of the flexible element that moves so as to be representative of the average position of the arms, said transducer being so connected to the transmitter that the frequency of the transmitted pulses will be varied and be representative of the positions of the measuring arms and of the cross-sectional area of the well bore.

RALPH W. GOBLE.

References Cited in the file of this patent

UNITED STATES PATENTS

| Number | Name | Date |
| --- | --- | --- |
| Re. 15,540 | De Forest | Feb. 13, 1923 |
| 2,030,244 | Cox | Feb. 11, 1936 |
| 2,036,458 | Carlson | Apr. 7, 1936 |
| 2,150,070 | Kregecz | Mar. 7, 1939 |
| 2,267,110 | Kinley et al. | Dec. 23, 1941 |
| 2,316,975 | Ruge et al. | Apr. 20, 1943 |
| 2,322,319 | Ruge | June 22, 1943 |
| 2,322,343 | Brandon | June 22, 1943 |
| 2,350,073 | Simmons | May 30, 1944 |
| 2,370,818 | Silverman | Mar. 6, 1945 |
| 2,379,996 | Silverman | July 10, 1945 |
| 2,392,357 | Bays | Jan. 8, 1946 |
| 2,406,982 | Zworykin | Sept. 3, 1946 |
| 2,415,636 | Johnson | Feb. 11, 1947 |
| 2,421,933 | Goldstine | June 10, 1947 |
| 2,432,748 | Glass | Dec. 16, 1947 |
| 2,477,085 | Reiber | July 26, 1949 |
| 2,484,218 | Giffen | Oct. 11, 1949 |
| 2,495,797 | Whitlock et al. | Jan. 31, 1950 |
| 2,508,419 | Ramberg | May 23, 1950 |
| 2,547,876 | Krasnow | Apr. 3, 1951 |

OTHER REFERENCES

Publ.: "A Vacuum Type Transducer etc.," James F. Gordon. Proceedings of I. R. E., vol. 35, December 1947, pages 1571–1575.

Publ.: Instruments, vol. 21, page 880, October 1948, Variable resistance spring transducer. Based on Nat'l. Bureau of Standards Technical Report 1286.